United States Patent [19]

Kennedy et al.

[11] Patent Number: 5,740,417
[45] Date of Patent: Apr. 14, 1998

[54] PIPELINED PROCESSOR OPERATING IN DIFFERENT POWER MODE BASED ON BRANCH PREDICTION STATE OF BRANCH HISTORY BIT ENCODED AS TAKEN WEAKLY NOT TAKEN AND STRONGLY NOT TAKEN STATES

[75] Inventors: A. Richard Kennedy, Austin; Cody B. Croxton, Georgetown, both of Tex.

[73] Assignee: Motorola, Inc., Schaumburg, Ill.

[21] Appl. No.: 567,591

[22] Filed: Dec. 5, 1995

[51] Int. Cl.⁶ .................................................. G06F 9/38
[52] U.S. Cl. .................................................. 395/586; 395/587
[58] Field of Search .................................. 395/586, 587

[56] References Cited

U.S. PATENT DOCUMENTS

| | | |
|---|---|---|
| 5,163,140 | 11/1992 | Stiles et al. . |
| 5,175,827 | 12/1992 | Morisada . |
| 5,210,831 | 5/1993 | Emma et al. . |
| 5,228,131 | 7/1993 | Ueda et al. . |
| 5,230,068 | 7/1993 | Van Dyke et al. . |
| 5,317,702 | 5/1994 | Morisada . |
| 5,392,437 | 2/1995 | Matter et al. . |
| 5,394,529 | 2/1995 | Brown, III et al. ............ 395/587 |
| 5,423,011 | 6/1995 | Blaner et al. .................. 395/587 |
| 5,577,217 | 11/1996 | Hoyt et al. ..................... 395/376 |
| 5,584,001 | 12/1996 | Hoyt et al. ..................... 395/585 |
| 5,606,676 | 2/1997 | Grochowski et al. .......... 395/586 |

*Primary Examiner*—Krisna Lim
*Attorney, Agent, or Firm*—Paul J. Polansky

[57] ABSTRACT

A low-power pipelined data processor (20) includes a branch prediction mechanism for speculatively placing branch target instructions into the fetch, decode, dispatch, and execute pipeline when a branch is predicted to be taken. To save power the data processor (20) selectively disables one or more pipeline resources (24) associated with placing the branch target instructions into the pipeline according to the strength of the prediction. If the prediction is weakly not taken, the data processor (20) enables the pipeline resource (24) to prevent disruptions to the pipeline if the branch resolves as taken during the cycle. However if the prediction is strongly not taken, the pipeline resource (24) is disabled to save power, which outweighs the infrequent resolution to taken. In one embodiment, the data processor (20) disables a branch target instruction cache (24) if history bits corresponding to the branch instruction stored in a branch history table (26) indicate strongly that the branch will not be taken.

14 Claims, 2 Drawing Sheets

PIPELINED PROCESSOR OPERATING IN DIFFERENT POWER MODE BASED ON BRANCH PREDICTION STATE OF BRANCH HISTORY BIT ENCODED AS TAKEN WEAKLY NOT TAKEN AND STRONGLY NOT TAKEN STATES

FIELD OF THE INVENTION

This invention relates generally to data processors, and more particularly, to pipelined data processors.

BACKGROUND OF THE INVENTION

High performance data processors typically include several independent resources to perform many operations in parallel. These resources may include many different types of circuits, including independent execution units, register files, caches, and the like. Examples of independent execution units include an integer unit (IU), a floating point unit (FPU), an instruction dispatch unit, and a load/store unit. The register files may be associated with the execution units, and examples include general purpose registers (GPRs) associated with the IU and floating point registers (FPRs) associated with the FPU.

These data processors also use what is known as "pipelining" and "speculative execution". Pipelining is a technique that breaks instructions into distinct steps so that multiple steps can be performed at the same time. The events necessary to process an instruction are broken into several cycle-length tasks to allow work to be performed on several instructions simultaneously. Each distinct step is known as a stage. A typical instruction pipeline includes the fetch, decode, execute, and completion stages, but may also include a dispatch stage as either a separate stage or combined with the decode stage. The independent resources are used to implement the pipeline.

Speculative execution involves the process of guessing whether a conditional branch will be taken. The prediction may later prove to be correct or incorrect. If the prediction is later proved correct, then performance is improved by processing the branch instructions through the pipeline before the condition is resolved. If the prediction is later proved to be incorrect, then the pipeline must be flushed of the instructions which will require extra cycles. Thus, the improvement in efficiency depends on the prediction accuracy.

In general there are two types of prediction, static prediction and dynamic prediction. Static prediction involves the examining the branch instruction itself. Dynamic prediction involves determining whether the branch is likely to be taken based on whether the history indicates it is likely that the branch will be taken. If the prediction is that the branch will be taken, a data processor using speculative execution begins decoding and executing the instructions at the branch target address before the outcome of the branch is determined.

As can be imagined, these data processors are much more complex than non-parallel data processors and require a large amount of integrated circuit area. While the complexity of data processors has grown, the need to conserve power has also grown. For example, portable computers which use the most powerful microprocessors are becoming increasingly popular. Battery life of these computers is a critical consideration to a user. Thus the need to achieve higher levels of performance but also to consume a minimum amount of power is required.

Contemporary integrated circuit data processors are usually fabricated using complementary metal-oxide-semiconductor (CMOS) or bipolar-CMOS (BICMOS) techniques. CMOS logic circuits have the characteristic that current is only drawn during switching. Thus most techniques to conserve power in data processors have focused on stopping the generation of clocking signals. Smith et al. in U.S. Pat. No. 4,748,559, "Apparatus for Reducing Power Consumed by a Static Microprocessor," issued May 31, 1988 and assigned to the assignee hereof teach this technique for a non-pipelined processor. Further techniques are required, however, for pipelined processors in which some resources will be required to be operational while others will not. Such a technique is provided by the present invention, whose features and advantages will be more clearly understood from the following detailed description taken in conjunction with the accompanying drawings.

DETAILED DESCRIPTION OF THE PREFERRED EMBODIMENT

According to the present invention, a pipelined data processor speculatively places branch target instructions into a processing pipeline if history bits predict that the branch will be taken. However the data processor may perform at least one function associated with placing the instruction into the pipeline even though the prediction is not taken based on the strength of the not taken prediction. For example, if the data processor weakly predicts that the branch will not be taken, the data processor nonetheless enables a resource associated with placing instructions into the pipeline so that if the condition nonetheless resolves as taken within the cycle, then results will be available without having to back up and waste cycles. However, if the branch is strongly predicted to be not taken, the resource is not enabled and only very rarely will the condition resolve to taken in the current cycle. Most of the time the condition does not resolve or resolves to not taken, saving the power consumed by the resource. The saving in power justifies the occasional but infrequent loss in performance due to incorrect prediction.

In the illustrated example, a branch target instruction cache (BTIC) which supplies branch target instructions to the pipeline when the branch is predicted taken is selectively disabled when the instruction being placed in the pipeline is predicted to be not taken. When the branch is only weakly predicted to be not taken, the BTIC remains enabled to fetch the branch target instruction so that if the condition nonetheless resolves to taken within the cycle, the branch target instruction will be available. Specifically, the disabling is accomplished by disabling word line drivers and comparators in the BTIC. In other embodiments, the strongly not taken prediction may cause other resources to be disabled, which are enabled in a less strongly not taken state, saving power in these resources as well.

Figure 1:
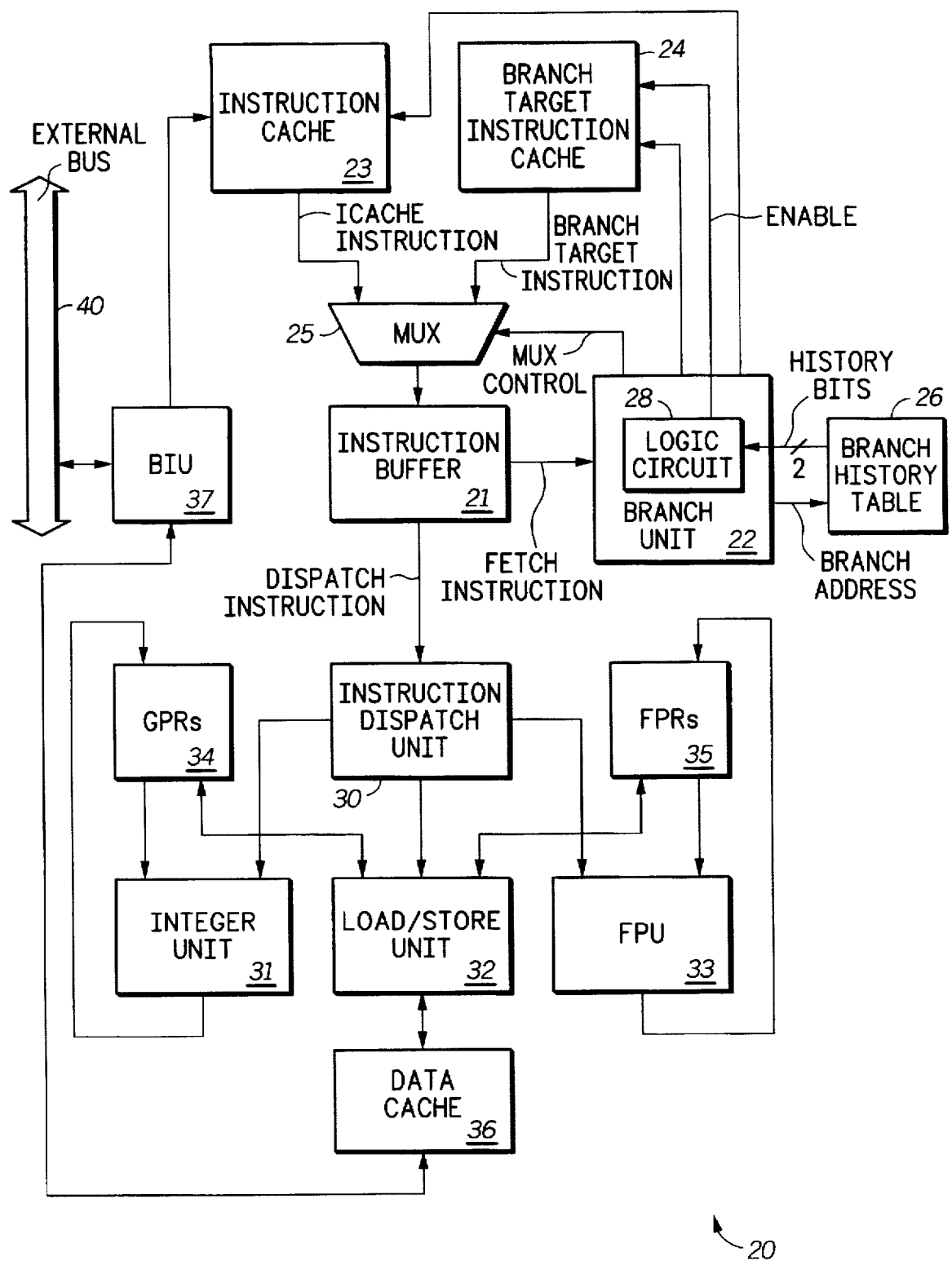
FIG. 1 illustrates in block diagram form a data processor according to the present invention.

These features will be better understood with reference to FIG. 1, which illustrates in block diagram form a data processor 20 according to the present invention. Data processor 20 is a reduced instruction set computer (RISC) pipelined data processor which processes instructions in several independent execution units in parallel. Instructions are placed into a four-stage pipeline which consists of a fetch stage, a dispatch and decode stage, an execute stage, and a completion stage.

The fetch stage identifies and fetches instructions to be placed into the instruction stream. An instruction buffer 21 receives and queues instructions and outputs them on a first-in, first-out basis to an instruction dispatch unit 30. For this purpose instruction buffer 21 has an output for providing a signal labelled "DISPATCH INSTRUCTION". Instruction buffer 21 receives instructions from one of two sources. One source is an instruction cache 23, which serves generally as a source of sequential instructions and has an output for providing a value labelled "ICACHE INSTRUCTION". Instruction cache 23 has a control input for receiving an input address, and has a bidirectional terminal connected to a bus interface unit (BIU) 37. BIU 37 performs bus cycles on an external memory connected to an external bus 40 and serves as a source for instructions into instruction cache 23.

A second source of instructions is a branch target instruction cache (BTIC) 24. BTIC 24 supplies instructions associated with branches. BTIC 24 has an input for receiving a branch address, a control input for receiving a signal labelled "ENABLE", and an output for providing a value labelled "BRANCH TARGET INSTRUCTION". BTIC 24 receives the branch address, and compares the branch address to each of its tags. If a valid tag matches the branch address, then BTIC 24 outputs the BRANCH TARGET INSTRUCTION corresponding thereto. Note that BTIC 24 may be replaced as well by a branch target address cache (BTAC), which instead of storing branch instructions, only stores the addresses of the branch target instructions.

These two sources of instructions, instruction cache 23 and BTIC 24, provide their respective outputs to inputs of a multiplexer (MUX) 25. MUX 25 also has a control input for receiving a signal labelled "MUX CONTROL" which determines whether the ICACHE INSTRUCTION or the BRANCH TARGET INSTRUCTION will be provided to the output thereof, which represents a next instruction to instruction buffer 21.

A branch unit 22 determines whether a current instruction received from instruction buffer 21 is a branch instruction and if so predicts whether the branch will be taken. Branch unit 22 has an input for receiving the current instruction, labelled "FETCH INSTRUCTION", from instruction buffer 21. Branch unit 22 performs partial decoding of the FETCH INSTRUCTION to determine whether it is a branch. If the FETCH INSTRUCTION is in fact a branch, branch unit 22 accesses a branch history table 26 to determine the branch instruction's branch prediction state. Branch unit 22 performs this access by providing an output labelled "BRANCH ADDRESS" corresponding to the FETCH INSTRUCTION to branch history table 26. Branch history table 26 includes multiple entries to store the branch history of each of several branch instructions. The branch state may be encoded in one of a variety of ways, and branch unit 22 is continuously updating the branch prediction state according to the actual resolution of the condition. As will become apparent, the present invention is not limited to any particular set of branch prediction states except that the branch prediction mechanism must encode at least one taken state, a weakly not taken state, and a strongly not taken state. In the illustrated embodiment, branch unit 22 maintains four prediction states, including a strongly taken state, a weakly taken state, a weakly not taken state, and a strongly not taken state. Thus, branch history table 26 requires two history bits to encode these four states, which are output as a signal labelled "HISTORY BITS" to branch unit 22. Branch unit 22 further includes a logic circuit 28 which receives the HISTORY BITS and outputs a signal labelled "ENABLE" in response.

If enabled, BTIC 24 attempts to find the branch target instruction corresponding to the fetch instruction provided by branch unit 22. In the illustrated embodiment, logic circuit 28 activates signal ENABLE when the HISTORY BITS encode the strongly taken, weakly taken, and weakly not taken states, and drives signal ENABLE in the inactive state only when the HISTORY BITS encode the strongly not taken state. Thus, BTIC 24 performs the branch target instruction lookup to provide the BRANCH TARGET INSTRUCTION to the input of MUX 25 (if there is a hit in BTIC 24) even in the weakly not taken state. If the branch then resolves as taken, even though the prediction was (weakly) not taken, there will be no need perform corrective actions to flush an incorrect instruction from instruction buffer 21.

If the branch is predicted (strongly or weakly) or resolved taken, then branch unit 22 provides the MUX CONTROL signal at a logic state to enable the second input of MUX 25 to place the "BRANCH TARGET INSTRUCTION" received from BTIC 24 into instruction buffer 21. If the branch is predicted (strongly or weakly) or resolved not taken, then branch unit 22 provides the MUX CONTROL signal at a logic state to enable the first input of MUX 25 to place the ICACHE INSTRUCTION received from instruction cache 23 into instruction buffer 21.

Since BTIC 24 is enabled in the weakly not taken state as well, it will attempt to access the branch target instruction corresponding to the FETCH INSTRUCTION. Thus, assuming it is present, BTIC 24 will provide the BRANCH TARGET INSTRUCTION to the input of MUX 25 even though the prediction is not taken. Thus if the condition associated with the branch instruction resolves to be taken before the end of the cycle, the BRANCH TARGET INSTRUCTION is available without disrupting the pipeline. Occasionally, a branch predicted strongly not taken will resolve into taken by the time branch unit 22 is required to output MUX CONTROL. However, the BRANCH TARGET INSTRUCTION is not valid since logic circuit 28 did not previously enable the lookup. In this case, processing will be stalled until the missing instruction is located. In the illustrated embodiment, branch unit 22 will look for the instruction directly in instruction cache 23 without attempting an access to BTIC 24. However, statistically the occurrence of this situation is rare. If however the branch is resolved to be taken within the clock cycle, then branch unit 22 must insert a wait state, or "bubble", into the pipeline. During this wait state, branch unit 22 initiates a lookup at the branch target address within instruction cache 23. In this case the ICACHE instruction will be a branch target instruction rather than a sequential instruction. Note that statistically the occurrence of an incorrect prediction of strongly not taken, which resolves to be taken within the same clock cycle as the lookup, will be rare, and is believed to occur only about 2% of the time for typical software.

Other blocks of data processor 20 are associated with the dispatch/decode, execute, and completion stages of the pipeline. An instruction dispatch unit 30 receives, in first-in, first-out format, the DISPATCH INSTRUCTION which is the oldest instruction from instruction buffer 21. Instruction dispatch unit 30 partially decodes the DISPATCH INSTRUCTION and determines which execution unit to dispatch the instruction to. Data processor 20 includes three such execution units: an integer unit 31, a load/store unit 32, and a floating point unit (FPU) 33. Each of these execution units has an input connected to instruction dispatch unit 30 for receiving the partially decoded instruction, and fully decodes the instructions as received. Integer unit 34 also has an input connected to a set of general purpose registers (GPRs) 34, and an output for providing a result back into GPRs 34 when the instruction is completed. Similarly, FPU 33 has an input connected to a set of floating point registers (FPRs), and has an output connected back into FPRs 35 for storage of the result when the instruction is completed. In addition to an input for receiving the partially-decoded load/store instruction from instruction dispatch unit 30, load/store unit 32 also has bidirectional connections to GPRs 34, FPRs 35, and to a data cache 36. Data cache 36 has a bidirectional connection to BIU 37.

Figure 2:
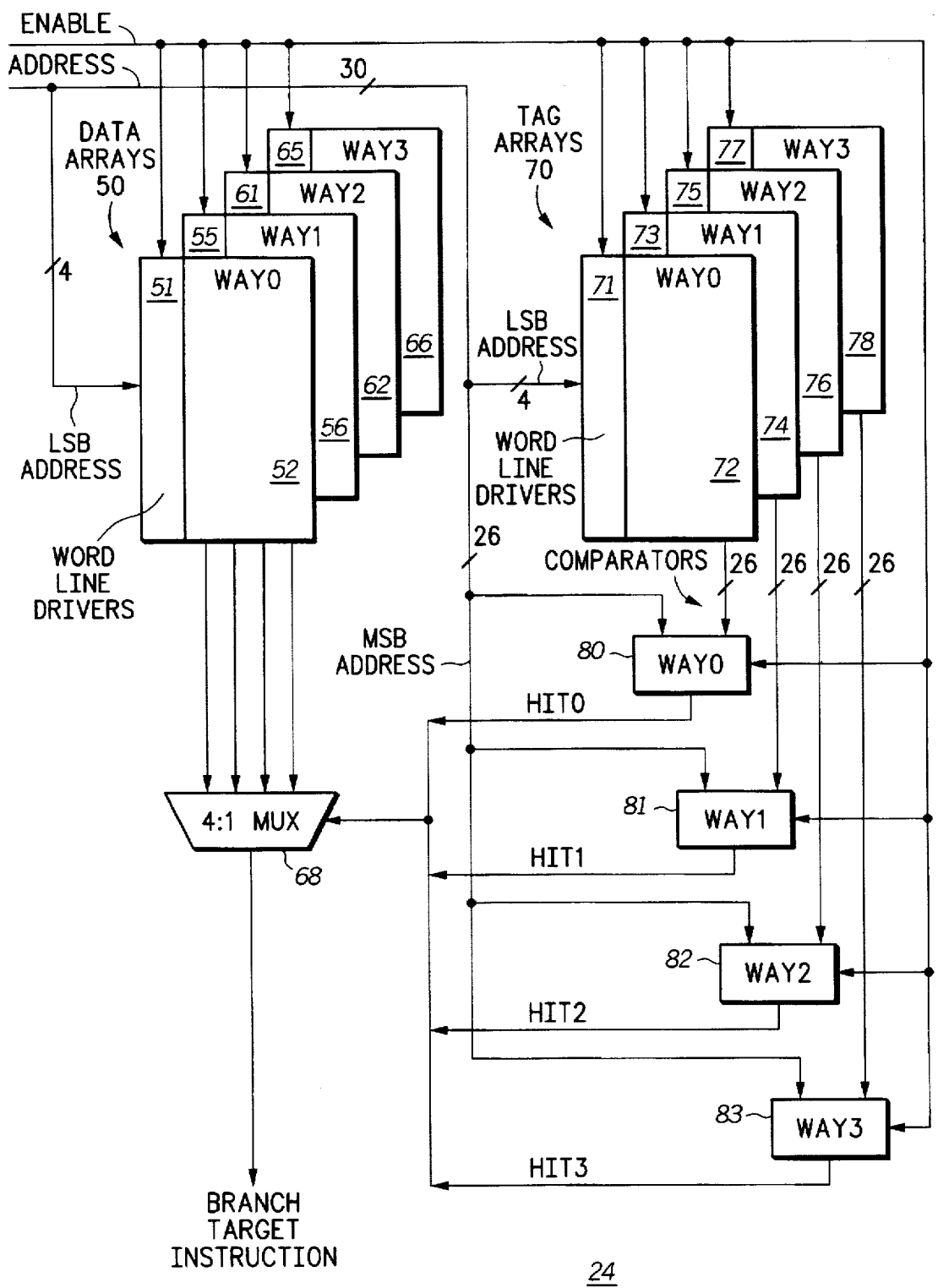
FIG. 2 illustrates in block diagram form the branch target instruction cache of FIG. 1.

FIG. 2 illustrates in block diagram form BTIC 24 of FIG. 1. BTIC 24 is a four-way, set-associative cache containing a set of data arrays 50 having four data arrays 52, 56, 62, and 66, and a set of tag arrays 70 having four tag arrays 72, 74, 76, and 78 corresponding to data arrays 52, 56, 62, and 66. Each data array and tag array receive the four least significant bits of an input address labeled "LSB ADDRESS". Corresponding to data arrays 52, 56, 62, and 66 are four word line drivers 51, 55, 61, and 65 which decode the LSB ADDRESS and activate one word line in each of the data arrays. The data element located at the accessed word line provides an output to a four-to-one multiplexer (4:1 MUX) 68, which provides the BRANCH TARGET INSTRUCTION at an output thereof.

Likewise corresponding to tag arrays 72, 74, 76, and 78 are four word line drivers 71, 73, 75, and 77 which decode the LSB ADDRESS and activate one word line in each of the tag arrays. Each tag array provides a 26-bit output to a corresponding one of four comparators 80–83. Each comparator compares the most significant twenty-six bits of the ADDRESS to the output of a corresponding tag array, and provides a corresponding hit signal if all twenty-six bits match. For example, comparator 80 activates a signal labelled "HIT0" if the most significant twenty-six bits of the ADDRESS match the tag in tag array 72 which is accessed by the LSB ADDRESS. MUX 68 in turn uses HIT0 and three other hit signals labelled "HIT1", "HIT2", and "HIT3" corresponding to comparators 81, 82, and 83, respectively, to select which of its inputs to provide as the BRANCH TARGET INSTRUCTION.

In order to save power by preventing the lookup when the branch prediction state is strongly not taken, signal ENABLE is provided as an input to word line drivers 51, 55, 61, 65, 71, 73, 75, and 77, and comparators 80–83. When disabled, these circuits which are implemented in complementary metal-oxide-semiconductor (CMOS) transistor technology consume substantially no power.

Note that in the illustrated embodiment, the data arrays and tag arrays, when selected by a corresponding word line driver, drive their outputs directly into inputs of either 4:1 MUX 68 or one of comparators 80–83 as the case may be. However in other embodiments, such as for larger sized caches, it may be desirable to include sense amplifiers at the outputs of the arrays to increase the drive strength of the memory cells in the arrays. In that case, signal ENABLE should preferably be used to disable these sense amplifiers as well.

While the invention has been described in the context of a preferred embodiment, it will be apparent to those skilled in the art that the present invention may be modified in numerous ways and may assume many embodiments other than that specifically set out and described above. For example in other embodiments, a BTAC will be used instead of a BTIC. Also the associativity and size of the branch target cache may vary from embodiment to embodiment. Also, other data processors may have different pipeline stages than those illustrated. Accordingly, it is intended by the appended claims to cover all modifications of the invention which fall within the true spirit and scope of the invention.

We claim:

1. A low-power pipelined data processor comprising:

a branch history table for storing in each of a plurality of entries an address and at least one history bit encoding a corresponding branch prediction state of a plurality of branch prediction states, said branch history table having an input for receiving a branch instruction address and an output for providing said at least one history bit of an entry of said plurality of entries whose address matches said branch instruction address;

said plurality of branch prediction states including a taken state, a weakly not taken state, and a strongly not taken state;

a pipeline resource having a control input for receiving an enable signal wherein said pipeline resource goes into a low-power mode when said enable signal is inactive; and a logic circuit having an input for receiving said at least one history bit, and an output for providing said enable signal;

said logic circuit providing said enable signal in an inactive state when said at least one history bit encodes said strongly not taken state;

said logic circuit providing said enable signal in an active state when said at least one history bit encodes said weakly not taken state or said taken state.

2. The data processor of claim 1 wherein said plurality of branch prediction states further includes a second taken state.

3. The data processor of claim 1 wherein said pipeline resource comprises a branch target cache.

4. The data processor of claim 3 wherein said branch target cache comprises a branch target address cache (BTAC).

5. The data processor of claim 3 wherein said branch target cache comprises a branch target instruction cache (BTIC) having an output for providing a branch target instruction.

6. The data processor of claim 5 further comprising:

an instruction cache for storing a plurality of sequential instructions and having an output for providing a next instruction of said plurality of sequential instructions;

a multiplexer having a first input coupled to said output of said instruction cache, a second input coupled to said output of said branch target instruction cache, a control input for receiving a control signal, and an output for providing a next instruction; and a branch unit having an input for receiving said at least one history bit, and an output for providing said control signal, said branch unit providing said control signal in a first logic state to enable said first input of said multiplexer when said at least one history bit encodes said strongly not taken state or said weakly not taken state, said branch unit providing said control signal in a second logic state to enable said second input of said multiplexer when said at least one history bit encodes said taken state.

7. A low-power pipelined data processor comprising:

a branch history table for storing for each of a plurality of entries at least one history bit which encodes one of a plurality of branch prediction states corresponding thereto, said branch history table having an input for receiving a branch address and an output for providing said at least one history bit of an entry of said plurality of entries whose address matches said branch address;

said plurality of branch prediction states including a taken state, a weakly not taken state, and a strongly not taken state;

a branch target instruction cache for storing in each of a plurality of entries an address and a branch target instruction corresponding to said address, said branch target instruction cache having an address input for receiving said branch address, a control input for receiving an enable signal, and an output for providing a branch target instruction associated with said branch address when enabled; and a logic circuit having an input for receiving said at least one history bit, and an output for providing said enable signal;

said logic circuit providing said enable signal in an inactive state when said at least one history bit encodes said strongly not taken state;

said logic circuit providing said enable signal in an active state when said at least one history bit encodes said weakly not taken state or said taken state.

8. The data processor of claim 7 wherein said plurality of branch prediction states further includes a second taken state.

9. The data processor of claim 7 further comprising:

an instruction cache for storing a plurality of sequential instructions and having an output for providing a next instruction of said plurality of sequential instructions;

a multiplexer having a first input coupled to said output of said instruction cache, a second input coupled to said output of said branch target instruction cache, a control input for receiving a control signal, and an output for providing a next instruction; and a branch unit having an input for receiving said at least one history bit, and an output for providing said control signal, said branch unit providing said control signal in a first logic state to enable said first input of said multiplexer when said at least one history bit encodes said strongly not taken state or said weakly not taken state, said branch unit providing said control signal in a second logic state to enable said second input of said multiplexer when said at least one history bit encodes said taken state.

10. The data processor of claim 9 further comprising an instruction buffer having an input coupled to said output of said multiplexer, and an output for providing a dispatch instruction.

11. The data processor of claim 10 further comprising:

an instruction dispatch unit having an input for receiving said dispatch instruction, and an output for providing an execute instruction; and a plurality of execution units each having an input coupled to said output of said instruction dispatch unit, and an output for providing a result of a respective function executed when said instruction dispatch unit dispatches said execute instruction thereto.

12. A method for speculatively executing branch instructions comprising the steps of:

receiving a branch instruction;

assigning to said branch instruction a branch prediction state of a plurality of branch prediction states including a taken state, a weakly not taken state, and a strongly not taken state; and either:

if said branch prediction state is said taken state, enabling a pipeline resource required for placing a branch target instruction associated with said branch instruction into a pipeline and subsequently placing said branch target instruction into said pipeline unless a branch associated with said branch instruction resolves to not taken during said step of enabling, or if said branch prediction state is said weakly not taken state, enabling said pipeline resource and subsequently placing said branch target instruction into said pipeline only if said branch resolves to taken during said step of enabling, or if said branch prediction state is said strongly not taken state, disabling said pipeline resource.

13. The method of claim 12 wherein said step of assigning is performed by the step of maintaining said branch prediction state in a history table.

14. The method of claim 13 wherein said steps of enabling said pipeline resource comprise the steps of enabling a branch target instruction cache (BTIC).

* * * * *